(12) United States Patent
Murayama

(10) Patent No.: US 7,341,187 B2
(45) Date of Patent: Mar. 11, 2008

(54) ARTICLE SENSOR AND ARTICLE TRANSPORT DEVICE HAVING SAME

(75) Inventor: Shigeto Murayama, Hikone (JP)

(73) Assignee: Daifuku Co., Ltd., Osaka (JP)

( * ) Notice: Subject to any disclaimer, the term of this patent is extended or adjusted under 35 U.S.C. 154(b) by 18 days.

(21) Appl. No.: 11/290,132

(22) Filed: Nov. 30, 2005

(65) Prior Publication Data

US 2006/0145882 A1    Jul. 6, 2006

(30) Foreign Application Priority Data

Dec. 10, 2004    (JP) .............................. 2004-358485

(51) Int. Cl.
*G06F 19/00*    (2006.01)
(52) U.S. Cl. .................... 235/385; 340/572; 340/686.1
(58) Field of Classification Search ........ 235/383–385, 235/451, 472.01–472.02; 340/686.1, 572
See application file for complete search history.

(56) References Cited

U.S. PATENT DOCUMENTS

| | | | | |
|---|---|---|---|---|
| 3,958,102 A | * | 5/1976 | Burt ............................ 235/385 |
| 5,404,384 A | * | 4/1995 | Colburn et al. ................. 377/6 |
| 5,475,367 A | * | 12/1995 | Prevost ..................... 340/568.8 |
| 5,558,483 A | * | 9/1996 | Masuda ....................... 414/278 |
| 6,933,846 B2 | * | 8/2005 | Moldavsky et al. ..... 340/568.1 |
| 7,111,781 B2 | * | 9/2006 | Fletcher ...................... 235/385 |
| 7,117,068 B2 | * | 10/2006 | Critchlow ................... 700/245 |
| 7,137,770 B2 | * | 11/2006 | Ueda .......................... 414/274 |

FOREIGN PATENT DOCUMENTS

| | | |
|---|---|---|
| JP | 62-235197 | 10/1987 |
| JP | 6-247697 | 9/1994 |
| JP | 2000-219498 | 8/2000 |

* cited by examiner

*Primary Examiner*—Michael G. Lee
*Assistant Examiner*—Tuyen Kim Vo
(74) *Attorney, Agent, or Firm*—The Webb Law Firm

(57) ABSTRACT

Article sensor for detecting an article on an article holder has an article detecting portion for detecting the presence or absence of an article and a wireless communication unit capable of wirelessly transmitting detected information from the article detecting portion. The article detecting portion and the wireless communication unit are assembled into a unit.

14 Claims, 8 Drawing Sheets

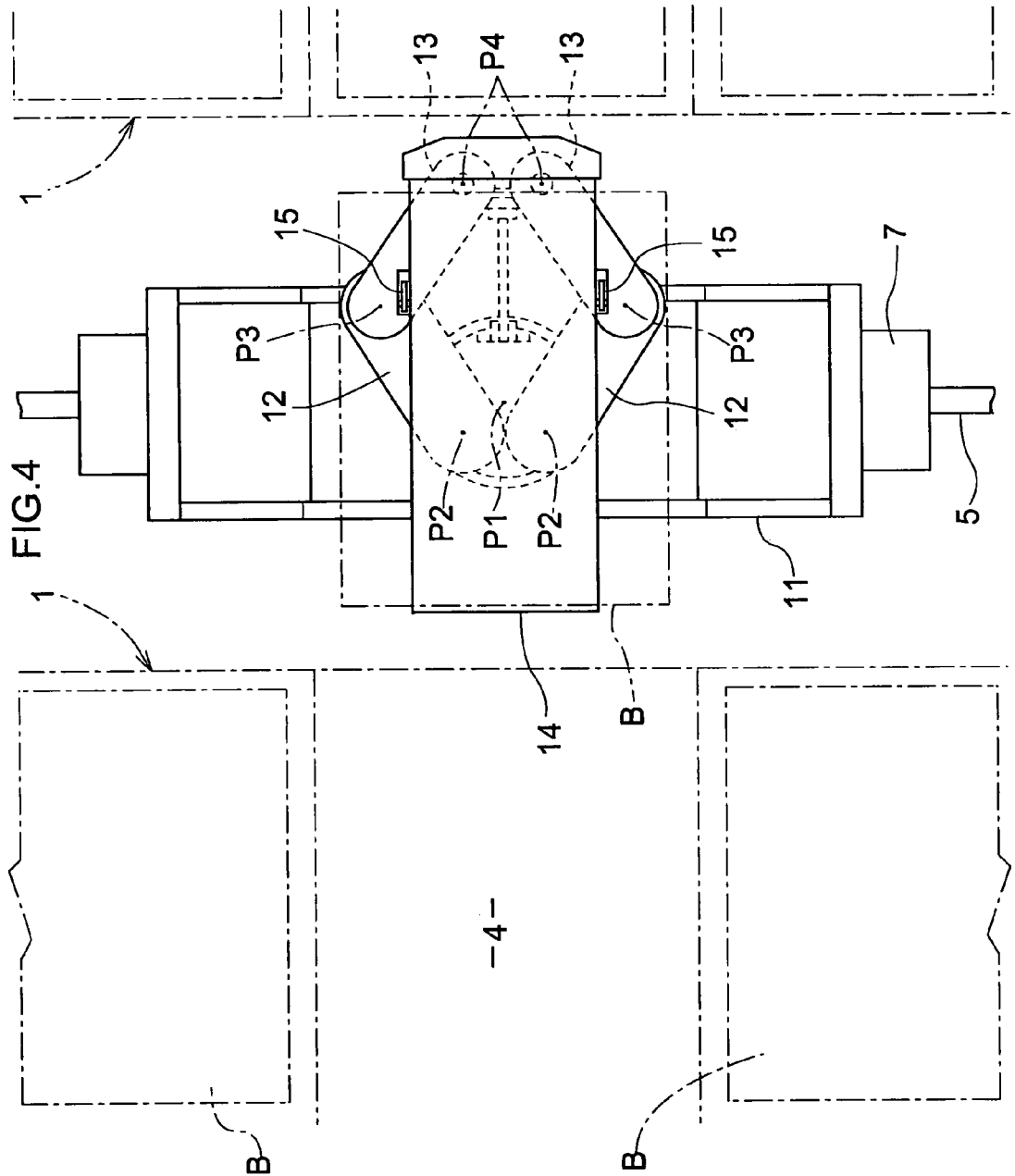

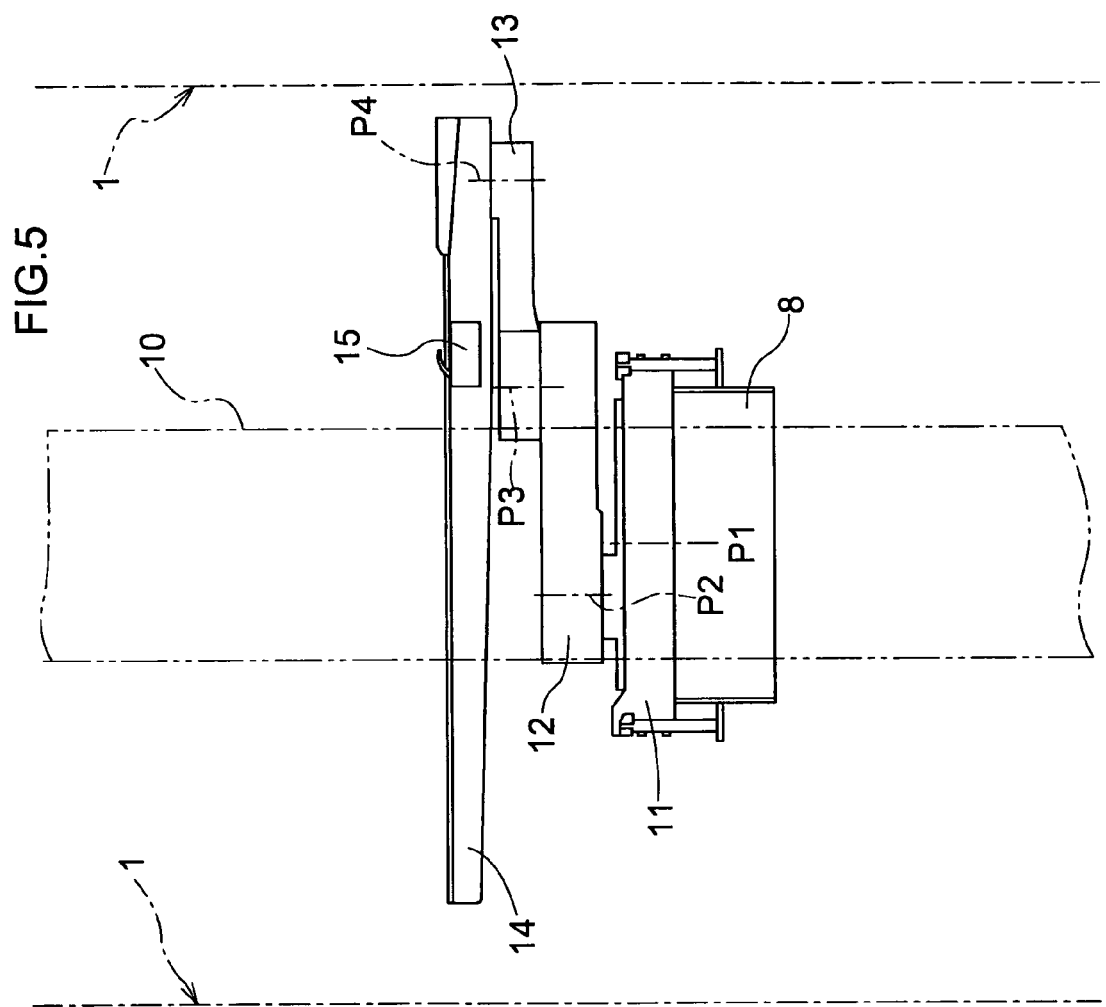

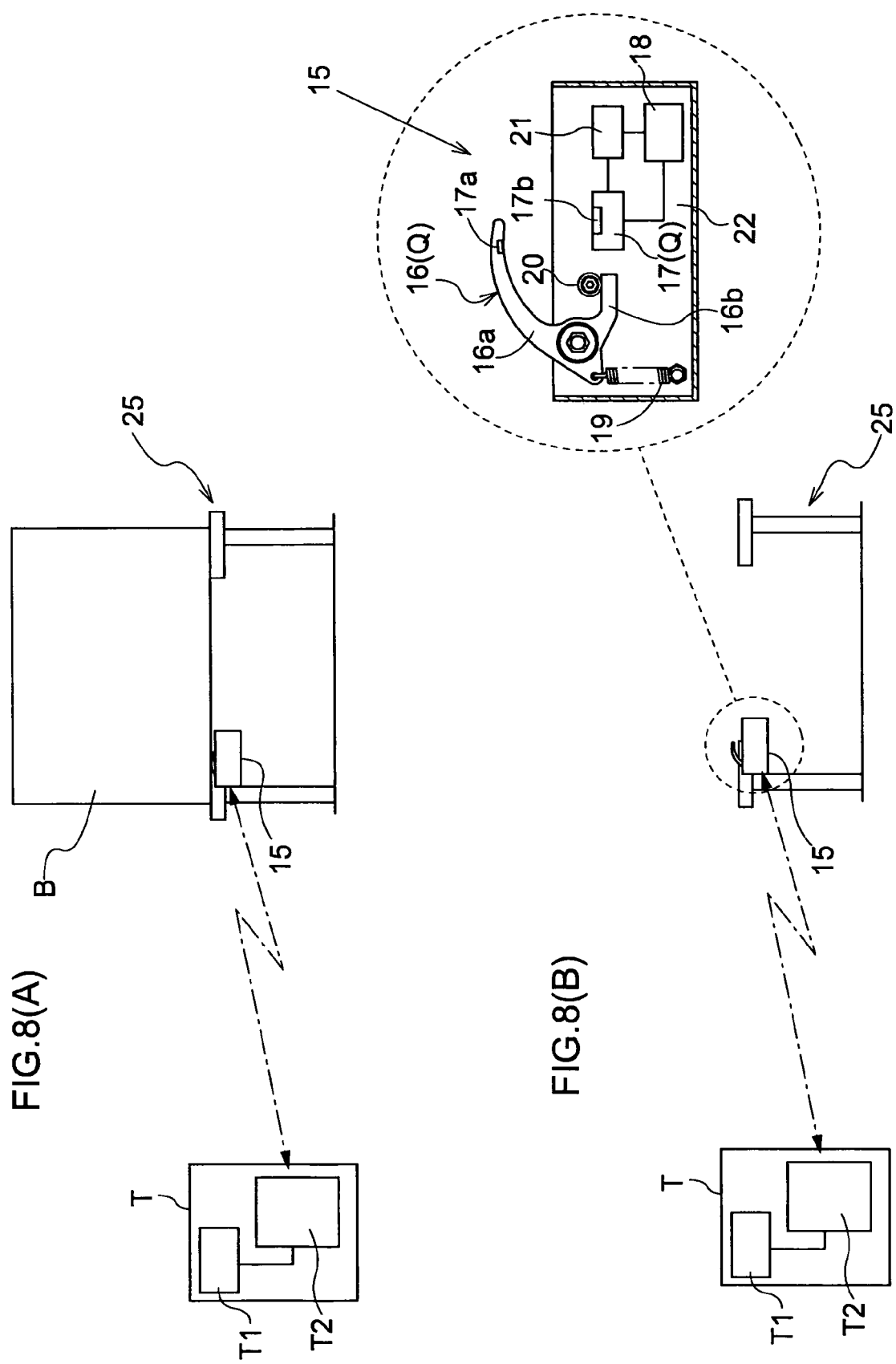

ARTICLE SENSOR AND ARTICLE TRANSPORT DEVICE HAVING SAME

BACKGROUND OF THE INVENTION

The present invention is directed to an article sensor capable of detecting an article on an article holder and an article transfer device having such sensor. While such article sensor is provided to detect an article on an article holder, it is possible to use it to determine if an article is in a proper position by placing the sensor so that the sensor would not detect the article if the article is not in the proper position. Examples for the location for the article sensor include an article holder provided to the article transfer device, a conveyer, and an article receiving platform. The horizontally movable article holder is provided to an article transfer device, such as a folk device, which in turn is provide to a moving body, such as a stacker crane, capable of moving to different article transfer locations to transfer articles between itself and the transfer locations. See, for example, JP2000-219498.

Conventional article sensors use communication wiring connected to the destination device for communicating the detected information. When the article sensor is located on the article transfer holder, the controller controls the moving body, such as a stacker crane, based on the detected information from the article sensor communicated through the communication wiring connected between the sensor and the controller. The controller determines if the article on the holder is not in the proper position based on the detected information from the article sensor and prevent the article from falling during the transporting process by, for example, stopping the moving body if and when it determines that the article is not in the proper position.

With conventional article sensors, wiring work is necessary in addition to placing the article sensor in the system.

When the article sensor is provided to the holder for transferring articles, the holder moves repeatedly between a projected position and a retracted position and so, the communication wire needs to be arranged so that it can bend and extend during the movements, which adds to the wiring work.

SUMMARY OF THE INVENTION

An object of the present invention is to provide an improved article sensor in light of the inconvenience described above.

To achieve the object of the invention, an article sensor for detecting an article on an article holder according to the present invention comprises an article detecting portion for detecting the presence or absence of an article; a wireless communication unit capable of wirelessly transmitting detected information from the article detecting portion. The article detecting portion and the wireless communication unit are assembled into a unit.

Since the article detecting portion and the wireless communication unit are assembled into a unit, less work is necessary to incorporate the sensor into the system. Also, since there is no communication wiring, the lifetime of the wiring does not affect the lifetime of the rest of the system.

BRIEF DESCRIPTION OF THE DRAWINGS

FIG. 4 shows a plan view of the stacker crane with the article holder in its retracted position, FIG. 5 shows a side view of the stacker crane with the article holder in its retracted position, FIGS. 8A and 8B show an article sensor on a conveyer.

DETAILED DESCRIPTION OF PREFERRED EMBODIMENTS

Preferred embodiments of the present invention will be described next with reference to the accompanying drawings.

First Embodiment

In the first embodiment, the article sensor is located on an article holder in an article transfer device, as an example for the location of the sensor.

Figure 1:
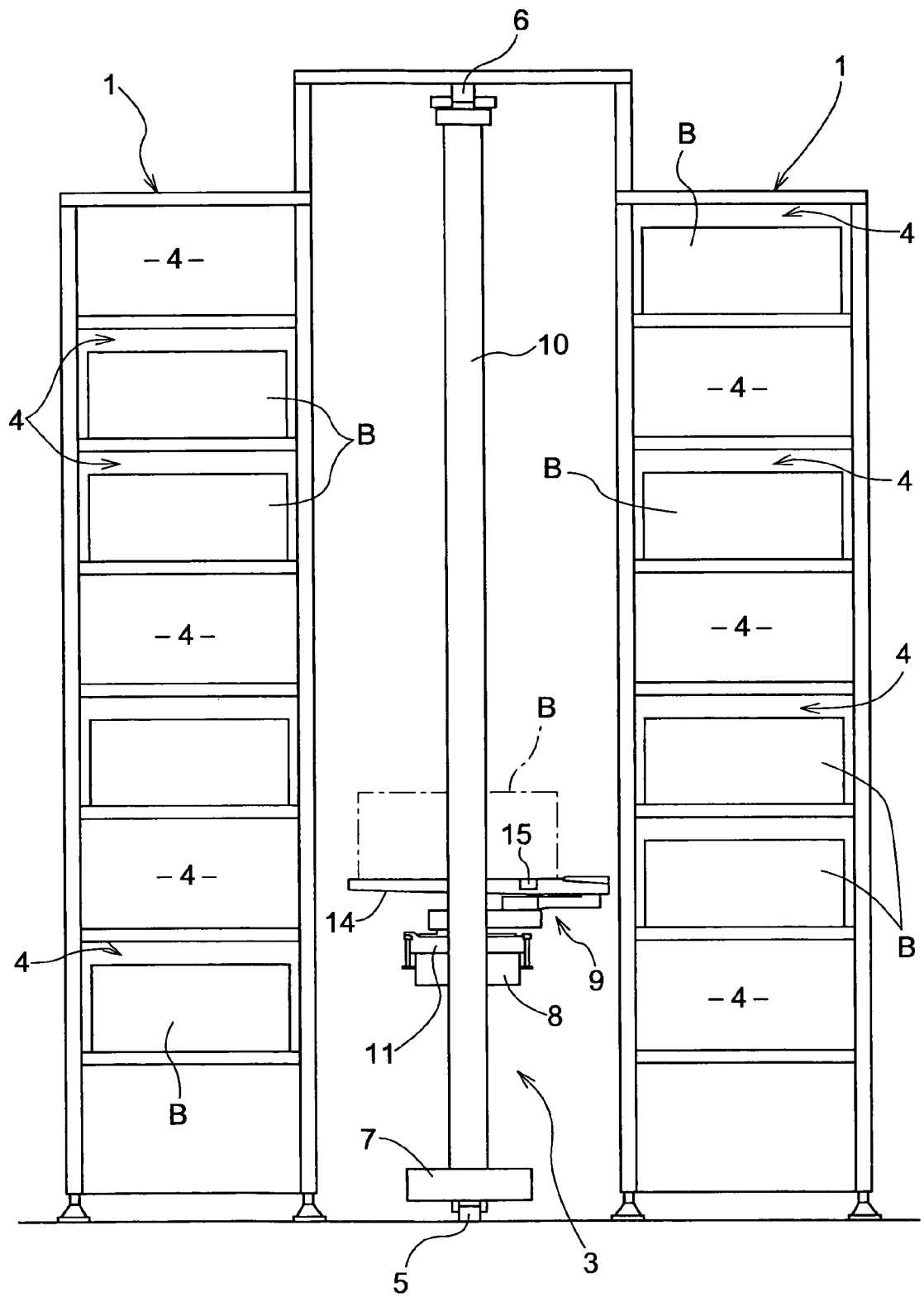
FIG. 1 shows a front view of the automated storage facility.

As shown in FIG. 1, the stacker crane 3 (moving body) is used, for example, in an automated storage facility, and is adapted to run automatically along a path between two storage racks with the openings for the articles in the respective racks facing each other.

While not shown in the drawings, each rack 1 has numerous article storage units 4 arranged in horizontal and vertical rows. Each storage unit 4 supports an article B by its lower surface with right and left support members. Examples of an article B includes, but not limited to, an article; a container for a plurality of articles; a member with a lower grid surface for supporting a plurality of articles.

The path for the stacker crane has a rail 5 that extends along the horizontal longitudinal direction of the storage rack 1 and an upper rail 6.

The stacker crane 3 has a vehicle 7 that can move along the rail 5 and a vertically movable platform 8 that can move vertically along a pair of front and rear vertical pillars 10 fixed to the vehicle 7. The vertically movable platform has an article transfer device 9 that can move an article B between itself and the article storage unit 4 or an article receiving location of the rack. The article storage unit 4 and article receiving location are example of an article transfer location.

The stacker crane 3 thus transport and transfer articles B between the article receiving location and a certain of article storage unit or between two article storage units through movements of the stacker crane 3, the vehicle 7, the vertically movable platform 8, and operation of the article transfer device 9.

As shown in FIGS. 2-5, the vertically movable platform 8 has, in its upper portion, a rotating platform 11 that is capable of rotating about a vertical axis P1. The article transfer device is provided on and above this rotating platform 11. Since the rotating platform 11 can rotate the article transfer device 9, the apparatus 9 can transfer the article to either of the two racks 1.

Figure 2:
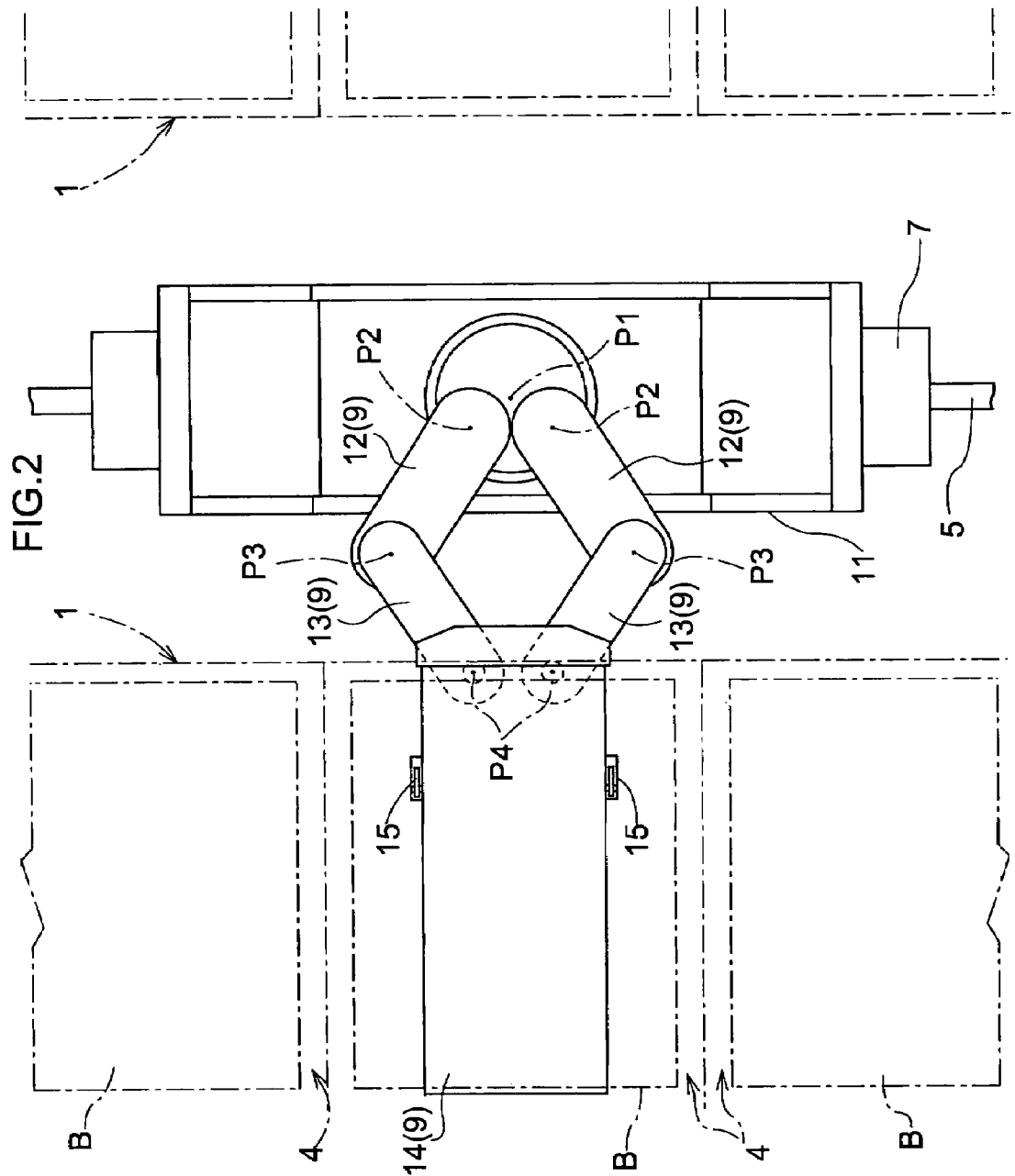
FIG. 2 shows a plan view of the stacker crane with the article holder in its transfer position.
Figure 3:
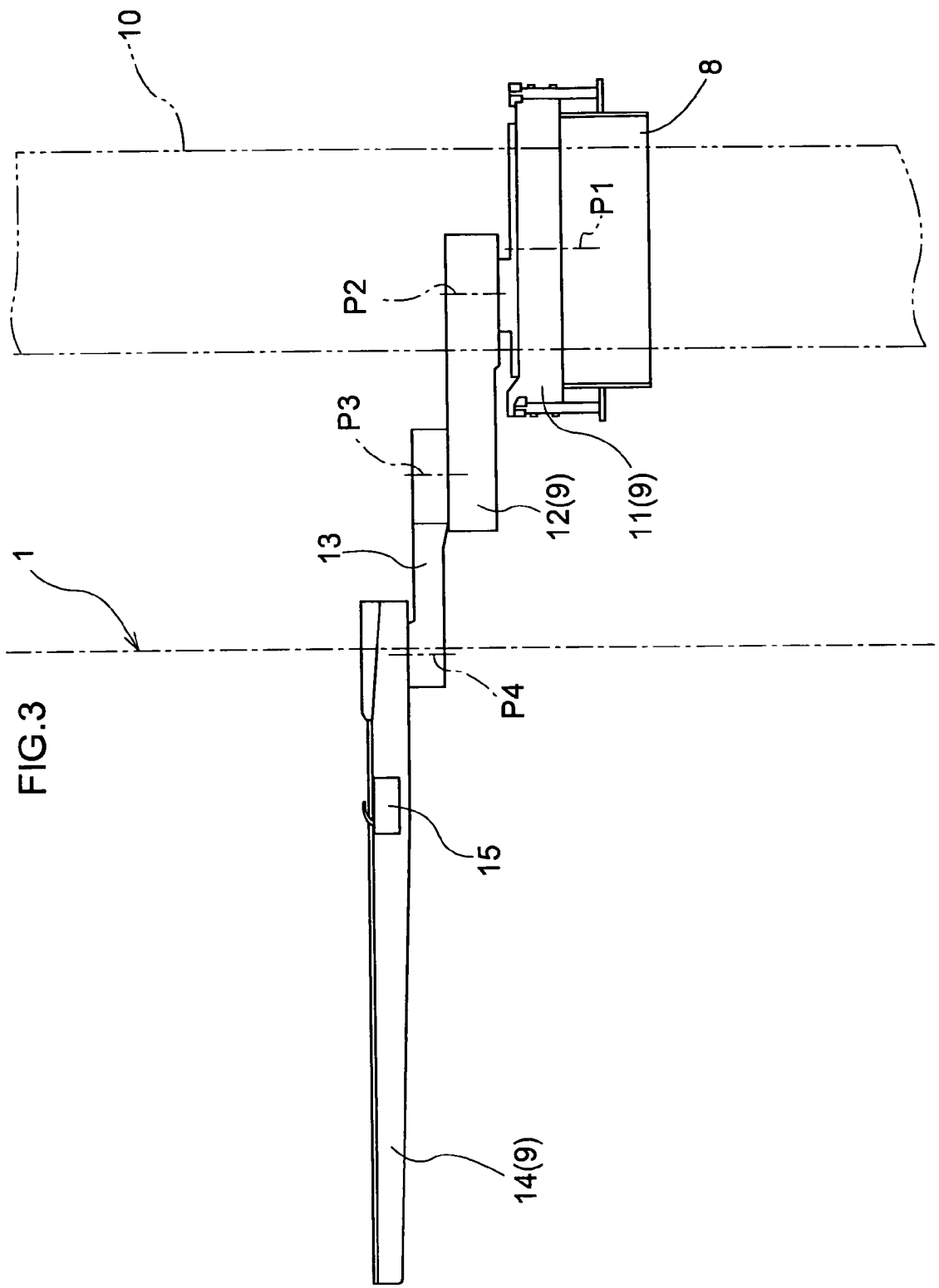
FIG. 3 shows a side view of the stacker crane with the article holder in its transfer position.

FIG. 2 shows a plan view of the article transfer device 9 and FIG. 3 shows a side view of the article transfer device 9 while FIG. 4 shows a plan view of the article transfer device 9 and FIG. 5 shows a side view of the article transfer device 9.

The article transfer device 9 has a pair of operation links 12, each of whose proximal portion is pivotable about respective vertical axis P2, a pair of pivot links 13, each of whose proximal end is pivotably connected about a vertical axis P3 with a forward end of the respective operation link 12 and an article holder 14 that is pivotable about a pair of axes P4 and connected to the forward ends of the pivot links 13.

By pivoting the pair of operation links 12 by an electric motor (not shown) about respective axis P2, the pair of pivot links 13 are thus pivoted about respective axis P3, resulting in a back and forth horizontal movement of the article holder 14.

The article transfer device 9 thus can move between a projecting position, shown in FIGS. 2 and 3, wherein the article holder 14 is at the transfer position either to receive an article B from the article transfer location or to transfer the article B to the location, and a retracted position, shown in FIGS. 4 and 5, where the holder 14 is pulled to its retracted position above the vertically movable platform 8.

Article sensors 15 for detecting an article B are provided at one or more locations on the article holder 14. In the present embodiment, one sensor 15 is located on each side face of the article holder 14 by means of any one of or a combination of conventional and known method such as bolts and nuts, adhesives, and hook-and-loop fastener.

As shown in FIG. 6, the article sensor 15 includes an article detecting portion Q that determines if an article is present, and a wireless communication unit 18 capable of communicating a detecting information from the detecting portion Q with an outside device via wireless communication.

The article detecting portion Q has a movable element 16 that can move between an article-absent position and an article-present position that is a depressed position by the article B as well as a position detector 17 that detects the position of the movable element 16. The movable element 16 is biased by a spring toward the article absent position.

The wireless communication unit 18 wirelessly transmits the detected information from the position detector 17 as detected information for the article detecting portion Q.

The movable element 16 has a curved-plate-shaped depressed portion 16a (a first arm) with a part of which extending along the bottom surface of the article B supported by the holder 14. The depressed portion 16a is pivotable vertically about a horizontal pivot axis P5, which is defined by a bolt that extends through a hole formed in one end of the depressed portion 16a. The depressed portion 16a is generally arc-shaped and has a horizontal tangent line defined by a portion of the depressed portion 16a when the movable element 16 is in its article-absent position. The movable element 16 also has a second arm 16b that is shorter in length than and is integrally formed with the depressed portion 16a. The depressed portion 16a and the second arm 16b together is generally U-shaped.

Figure 6A:
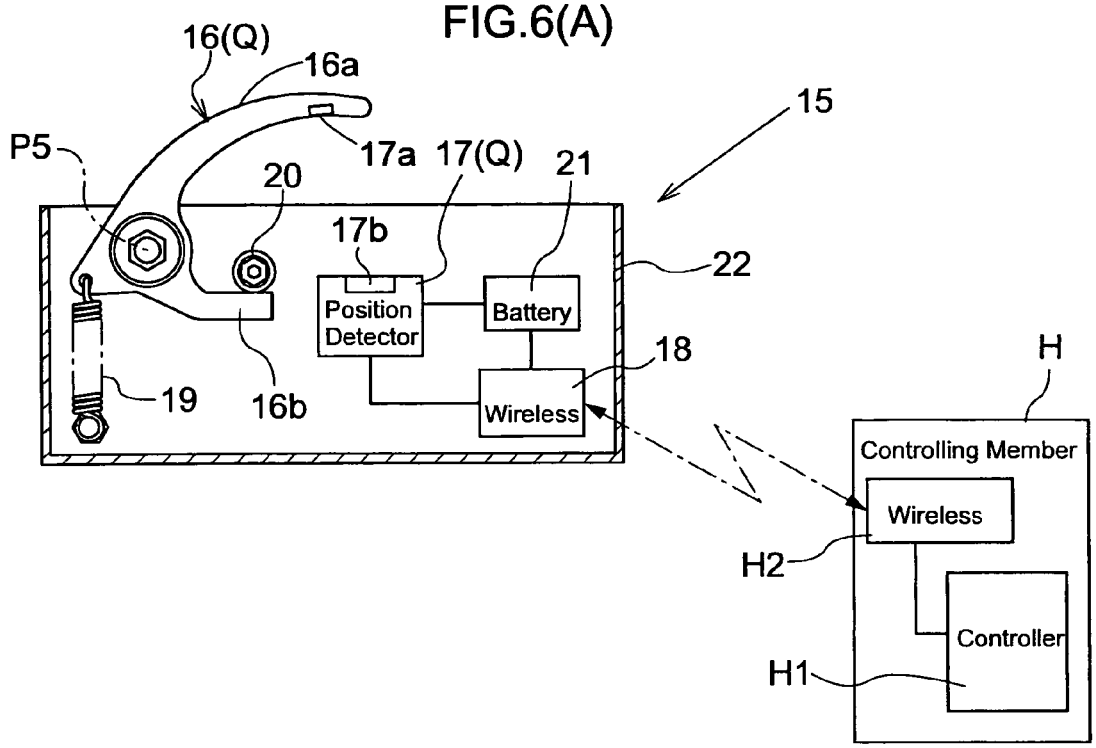
FIGS. 6A and 6B show side views of the article sensor.

The movable element 16 is urged by a coil spring 19 toward its article-absent position as shown in FIG. 6A. As shown in FIGS. 3 and 5, by abutment of the arm portion 16b against a stopper 20, the movable element 16 is maintained in a position where a part of the element 16 is above the supporting surface of the holder 14.

Figure 6B:
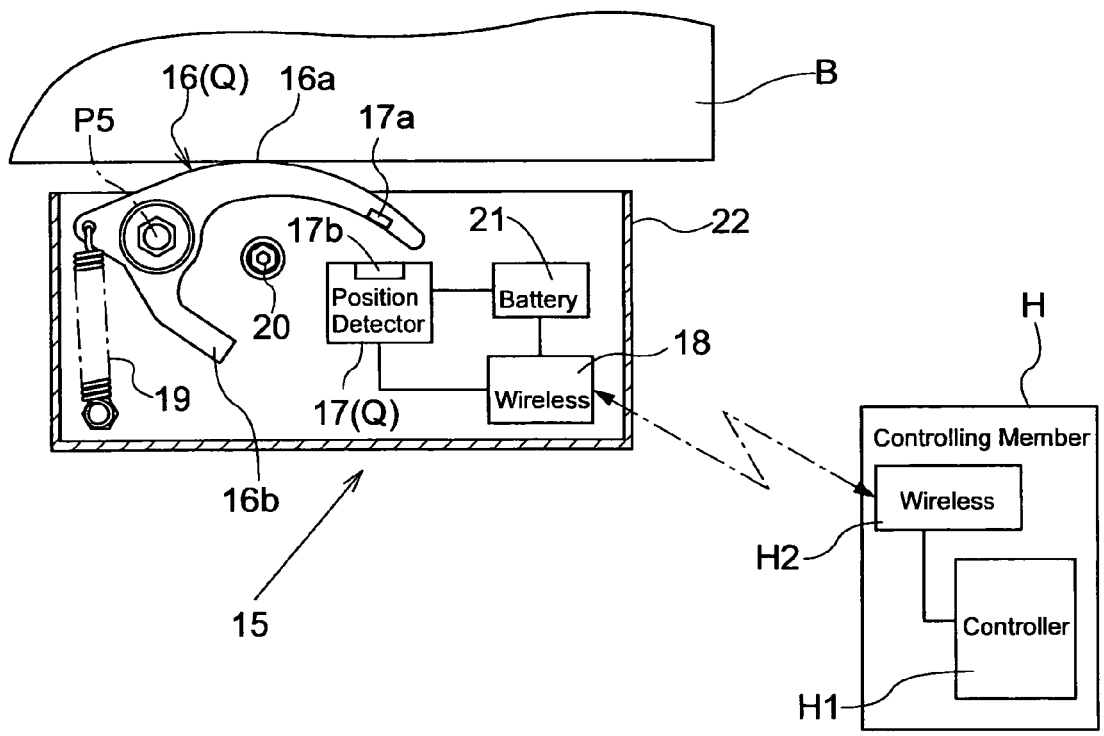

As shown in FIG. 6B, as the article B is placed on the holder 14, the bottom surface of the article abuts against and depresses the depressed portion 16a. Thus, movable element 16 is moved to the article-present position.

The position detector 17 is a proximity sensor 17b that detects the article-present position of the movable element 16 by detecting the magnetic substance located in the movable element 16. The magnetic substance may be located either within, or on the surface of, the movable element 16.

The wireless communication unit 18 wirelessly transmits the detected information from the position detector 17 to the controlling member H (controlling means) that controls the movements of the stacker crane 3. The wireless communication between the wireless communication unit 18 and the control member H may use a short-distance communication standard for handheld devices (such as Bluetooth™). However, any other wireless communication standard may be used for the present device.

The article detecting portion Q (the movable element 16 and the position detector 17) and the wireless communication unit 18 are integrated into a unit by virtue of the fact that they are supported by a casing of the article sensor 15 by means of any known and conventional fixing means such as bolts, adhesives, etc. This casing is preferably made of material transparent to electromagnetic waves such as resin. While it is possible to manufacture the casing with material less transparent to electromagnetic waves, such as metal and other material, to the extent that the material causes difficulty in communicating wirelessly, the difficulty may be overcome by using the casing as the antenna, or by providing a separate antenna or by creating an opening in the casing to the extent that such difficulty is avoided. The position detector 17 and the wireless communication unit 18 may be separate modules supported by the casing or they can be one modules having functions of the position detector 17 and the wireless communication unit 18.

A battery 21 (power supplying unit) that supplies power to the position detector 17 and the wireless communication unit 18 is integrally provided to the unit 22 by virtue of the fact that the battery 21 is supported by the casing by which the movable element 16, the position detector 17, and the wireless communication unit 18 are supported.

Since the movable element 16, the position detector 17, the wireless communication unit 18, and the battery 21 are provided as a unit, the article sensor 15 may be provided to the article holder 14 simply by mounting the unit 22 by means of any conventional fixing means such as bolts and nuts, adhesives, hook-and-loop fastener, etc., thus simplifying the work involved in the provision of the sensor to the system.

Figure 7:
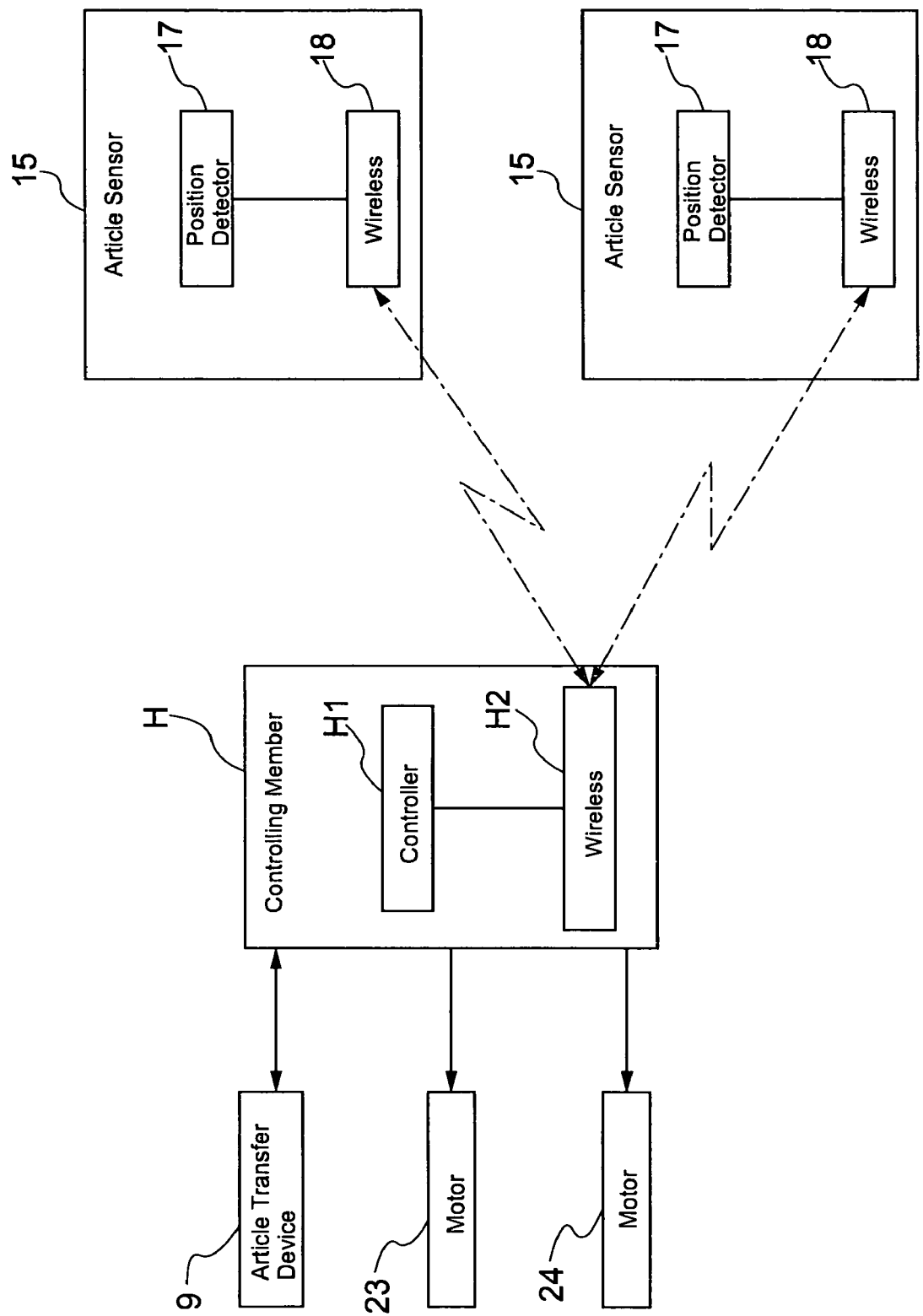
FIG. 7 shows a block diagram for controlling elements for the stacker crane.

As shown in FIG. 7, the controlling member H has a controller H1 that controls, among other things, the driving motor 23 for the vehicle 7, the motor 24 for the vertically movable platform 8, and the article transfer device 9. The controlling member also has a wireless communication unit H2.

When, for example, a transport request to transport an article B from an article storage unit 4 to a destination storage unit 4 is given, the controlling member H causes the article transfer device 9 to receive the article B from the article storage unit 4 onto the holder 14 and causes the stacker crane 3 to move to the proper position for the destination storage unit 4 with the article on the holder 14 after which, the controlling member H causes the transfer apparatus 9 to unload the article B into the destination article storage unit 4.

In an article receiving operation, the controlling member H causes the drive motor 23 and the motor 24 to move the vertically movable platform 8 to a position slightly below the article storage unit 4 and then operates the article transfer device 9 to move the article holder 14 in the retracted position to its extended transfer position.

The controlling member H causes the motor 24 to move the vertically movable platform 8 upwardly with the article holder 14 still in its transfer position thus lifting the article B off the storage unit 4 so that the article B is on the article holder 14. The controlling member H then causes the article transfer device 9 to pull in the article holder 14 to its retracted position.

The controlling member H confirms that the article is located in a proper position on the holder 14 if both of the article sensors 15 detect the presence of the article B.

When the control member H can not confirm that the article B is in a proper position, it causes the stacker crane 3 to stop by stopping the motors 23 and 24, and the article transfer device 9, and displays an error message.

In an article unloading operation, the controlling member H causes the drive motor 23 and the motor 24 to move the vertically movable platform 8 to a position slightly above the destination article storage unit 4 and then operates the article transfer apparatus 9 to move the holder 14 in the retracted position to its extended transfer position.

The controlling member H causes the motor 24 to move the vertically movable platform 8 downwardly with the article transfer portion 14 still in its transfer position so as to transfer the article B from the holder 14 to the storage unit 4.

The controlling member H confirms that the article has been transferred to the storage unit 4 if both of the article sensors 15 do not detect the presence of the article B, i.e. if both of the article sensors 15 detect the absence of the article B.

When the control member H can not confirm that the article B is in the storage unit 4, it causes the stacker crane 3 to stop by stopping the motors 23 and 24, and the article transfer device 9, and displays an error message.

In addition to determining if the article B is positioned on the holder 14, the controlling member H can determine if an article B is displaced to an improper location off from a proper location based on the detected information from the two article sensors 15.

When he control member H determines that the article B is out of a proper position during, for example, a transporting process between one article storage unit 4 to another, it causes the stacker crane 3 to stop by stopping the motors 23 and 24, and the article transfer device 9, and displays an error message.

Second Embodiment

In the second embodiment, the article sensor is located in a conveyer as an example for the location of the sensor.

In other words, in the present embodiment, a part of the conveyer is the article holder. As shown in FIGS. 8A and 8B, the article sensor 15 is located on an upstream portion of a conveyer 25 with respect to the conveying direction so as to be able to sense the presence of article B transported by the conveyer. The conveyer shown in FIGS. 8A and 8B has two conveying members 25. Any type of conveyer, such as a roller conveyer, or a belt conveyer, may be used in the example shown in FIG. 8.

Since the article sensor 15 is the same sensor described with respect to the first embodiment and thus detailed description of the sensor will not be repeated. As described above, the sensor 15 has a movable element 16, position detector 17 and a wireless communication unit 18, and a battery 21 that are integrated into a unit 22.

The communication unit 18 of the article sensor 15 communicates the detection information from the position detector 17 to the conveyer controller T that has a controller T1 and a controller-side wireless communication unit T2.

The conveyer controller T causes the conveyer 25 to operate when the article B is placed on the conveyer 25 based on the detection information from the article sensor 15.

While not shown in FIG. 8A or 8B, it is possible to provide a managing controller that oversees the operation of a plurality of conveyer controllers T.

Other Embodiments (1) In the above embodiments, the article detecting portion Q was described to have the movable element 16 and the position detector 17 as an exemplary embodiment. However, any other known article detecting mechanism, such as one that utilizes a light emitter and receiver arranged such that the light emitted by the emitter toward the receiver is blocked by the article when the article is in a proper position, may be used instead in the present invention.

(2) While a depressed portion 16a that can pivot vertically about an axis P5 located at the end of the depressed portion 16a was used as an example for a movable element 16 in the above-described embodiments, other designs such as one where the depressed portion can slide vertically, may be used instead.

The shape of the depressed portion is not limited to a curved plate shape and any other shapes may be used.

(3) A proximity sensor (such as a high frequency oscillation type) is used as an example of a position detector 17 in the embodiments described above. However, other type of sensors, such as a magnetic sensor using a magnet or an electrostatic capacitor type proximity sensor, may be used instead.

It is also possible to utilize a limit switch that is turned on when the article B is in an appropriate position as a position detecting portion 17 instead of a proximity sensor.

(4) While the article sensors 15 were positioned on either side of the article holder 14 in the first embodiment, it is possible to place one sensor on only one side of the holder 14 or to place four sensors 15 at near each corner of the holder 14. In other words, the number and the positioning of the sensor(s) can be varied depending on the situation and the requirements.

It is also possible to provide a plurality of article sensors 15 at different locations on the conveyer 25 in the second embodiment.

(5) In the first embodiment, the sensors 15 were located on the stacker crane 3, it is also possible to apply the present invention to any other vehicles such as an unmanned vehicle with a horizontally movable article transfer device with an article holding member.

(6) While the holder 14 was described as a location to provide the article sensors 15 in the first embodiment and conveyer 25 for the second embodiment, it is also possible to provide the article sensors in other locations such as an article receiving platform.

(7) While it is preferable to have the article detecting portion Q and the wireless communication unit 18 housed within one casing, it is possible to have the article detecting portion Q in one casing and the wireless communication unit 18 in another separate casing that is physically connected by means of a conventional connecting means.

It is also possible to have an arrangement wherein a battery 21 or a separate casing housing a battery 21 is attached to outside surface of the casing. In this case, the battery 21 provides power to the position detector 17 and wireless communication unit 18 via wires that extend though holes provided in the cases.

What is claimed is:

1. An article sensor for detecting an article on an article holder, the sensor comprising:
   article detecting portion for detecting presence or absence of an article;
   a wireless communication unit configured to wirelessly transmit detected information from the article detecting portion, wherein the article detecting portion and the wireless communication unit are assembled into a unit;
   a power supplying unit, for providing power to the article detecting portion and the wireless communication unit, is assembled into unit with the article detecting portion and the wireless communication unit; and
   wherein the article detecting portion has a movable element that can move between an article-absent position and an article present position that is a depressed position by an article, and a position detector that detects the position of the movable element, the movable element being urged toward its article-absent position.

2. An article sensor as defined in claim 1, wherein the movable element has a depressed portion including a plate-shaped portion that is adapted to extend along a lower surface of an article placed on the article holder.

3. An article sensor as defined in claim 1, wherein the article detecting portion and the wireless communication unit are assembled into a unit by virtue of the fact that the article detecting portion and the wireless communication unit are positioned within and are supported by a casing.

4. An article transport device configured to move an article between a plurality of article transfer locations, the article transport device comprising:
   a moving body configured to move to an article transfer location;
   an article transfer device provided to the moving body and configured to transfer an article to the article transfer location;
   an article holder provided to the article transfer device and configured to project and retract horizontally;
   at least one article sensor provided to the article holder, the sensor has an article detecting portion and a wireless communication unit configured to wirelessly transmit detected information from the article detecting portion, wherein the article detecting portion and a wireless communication unit are assembled into a unit, and wherein the wireless communication unit transmits the detected information from the article detecting portion to a controller that controls the moving body; and
   a power supplying unit, for providing power to the article detecting portion and the wireless communication unit, is assembled into a unit with the article detecting portion and the wireless communication unit.

5. An article transfer device as defined in claim 4, wherein a plurality of article sensors are provided to the article holder.

6. An article transfer device as defined in claim 4, wherein the article detecting portion has a movable element that can move between an article-absent position and an article-present position that is a depressed position by an article, and a position detector that detects the position of the movable element, the movable element being urged toward its article-absent position.

7. An article transfer device as defined in claim 6, wherein the movable element has a depressed portion including a plate-shaped portion that is adapted to extend along a lower surface of an article placed on the article holder.

8. An article transfer device as defined in claim 4, wherein the article detecting portion and the wireless communication unit are assembled into a unit by virtue of the fact that the article detecting portion and the wireless communication unit are positioned within and are supported by a casing.

9. Article sensor for detecting an article on an article holder, the sensor comprising:
   a casing adapted to be attached to the article holder at a location near an article holding surface of the article holder;
   a first arm supported to the casing and movable between a first position and a second position, the first arm having an upper surface configured to contact an article, and the first arm being urged toward the first position;
   a position sensor supported to the casing and configured to detect the first arm in the second position; and
   a wireless communication unit supported to the casing and configured to wirelessly transmit detected information from the position sensor.

10. An article sensor as defined in claim 9, wherein the first arm, the position sensor, and the wireless communication unit are positioned inside of the casing.

11. An article sensor as defined in claim 9 further comprising:
    a battery that provides power to the position sensor and the wireless communication unit, the battery being supported to the casing.

12. An article sensor as defined in claim 11, wherein the battery is positioned inside of the casing.

13. An article sensor as defined in claim 9 further comprising:
    a second arm connected with the first arm and pivotable in unison with the first arm, the second arm being configured to abut against a stopper fixed with respect to the casing to hold the first arm in the first position against an urging force.

14. An article sensor as defined in claim 9, wherein the sensor is a magnetic sensor that senses magnetic field caused by a magnetic element provided to the first arm.

* * * * *